US009175649B2

(12) United States Patent
McGuffin

(10) Patent No.: US 9,175,649 B2
(45) Date of Patent: Nov. 3, 2015

(54) REMOTE, BIDIRECTIONAL COMMUNICATION WITH AN ENGINE CONTROL UNIT

(76) Inventor: Jerry McGuffin, Oro Valley, AZ (US)

(*) Notice: Subject to any disclaimer, the term of this patent is extended or adjusted under 35 U.S.C. 154(b) by 841 days.

(21) Appl. No.: 13/453,955

(22) Filed: Apr. 23, 2012

(65) Prior Publication Data

US 2013/0085652 A1 Apr. 4, 2013

Related U.S. Application Data

(63) Continuation-in-part of application No. 13/252,070, filed on Oct. 3, 2011, now Pat. No. 8,165,781.

(60) Provisional application No. 61/299,780, filed on Jan. 29, 2010.

(51) Int. Cl.
| | |
|---|---|
| *F02D 41/00* | (2006.01) |
| *F02M 37/00* | (2006.01) |
| *F02D 41/26* | (2006.01) |
| F02M 37/20 | (2006.01) |
| F02D 41/04 | (2006.01) |
| F02D 41/30 | (2006.01) |

(52) U.S. Cl.
CPC ............. *F02M 37/00* (2013.01); *F02D 41/266* (2013.01); *F02D 41/042* (2013.01); *F02D 41/3082* (2013.01)

(58) Field of Classification Search
CPC ............... B67D 7/00; F02M 2037/085; F02D 41/3082; B65B 1/04
USPC .......... 123/515, 518–520; 701/103–105, 113, 701/115; 73/114.141–114.43
See application file for complete search history.

(56) References Cited

U.S. PATENT DOCUMENTS

| | | | | |
|---|---|---|---|---|
| 4,165,727 | A | * | 8/1979 | Fitzner et al. ............... 123/179.3 |
| 4,565,173 | A | * | 1/1986 | Oshiage et al. ............... 123/458 |
| 5,332,010 | A | | 7/1994 | Thompson et al. |
| 5,616,837 | A | | 4/1997 | Leonard et al. |
| 6,647,769 | B1 | | 11/2003 | Fujino et al. |
| 7,171,995 | B2 | | 2/2007 | Eshenour |
| 7,484,500 | B2 | | 2/2009 | Terada |
| 7,966,996 | B1 | | 6/2011 | Pursifull |
| 2003/0188303 | A1 | | 10/2003 | Barman et al. |
| 2009/0283174 | A1 | | 11/2009 | Mitchell |

FOREIGN PATENT DOCUMENTS

WO WO0152070 A1 7/2001

OTHER PUBLICATIONS

PCT/US2011/023227—International Search Report and Written Opinion dated Apr. 19, 2011.
PCT/US2012/034816—International Search Report and Written Opinion dated Nov. 1, 2012.

* cited by examiner

*Primary Examiner* — Hieu T Vo
*Assistant Examiner* — Arnold Castro

(57) ABSTRACT

A remote computing device communicates bi-directionally with an on-board computing device disposed in a combustion engine vehicle, wherein the on-board computing device controls a fuel pump of the vehicle. The remote computing device queries for and receives data about the vehicle from the on-board computing device, such as the Vehicle Identification Number, diagnostic information about the vehicle, and/or data about how the vehicle is being driven.

6 Claims, 8 Drawing Sheets

REMOTE, BIDIRECTIONAL COMMUNICATION WITH AN ENGINE CONTROL UNIT

CROSS-REFERENCE TO RELATED APPLICATIONS

This Application claims priority to and the benefit of U.S. Continuation-in-Part Application having Ser. No. 13/252,070, filed Oct. 3, 2011, entitled "Fuel Recovery," which claims priority to, and the benefit of, U.S. application having Ser. No. 13/018,154, filed Jan. 31, 2011, which claimed priority from a U.S. Provisional Application having Ser. No. 61/299,780 filed Jan. 29, 2010, the entire content of each of which is incorporated by reference herein.

FIELD OF THE INVENTION

Embodiments generally relate to bidirectional communication methods, systems, assemblies, and devices, and more particularly, to methods, systems, assemblies, and devices for bidirectional communication with an engine control unit; and most particularly to methods, systems, assemblies, and devices for remote, bidirectional communication with a combustion engine control unit.

BACKGROUND OF THE INVENTION

The petroleum dependency of the transportation industry is staggering. For example, a February 2005 study indicated that 370 million gallons of petroleum based gasoline fuel was used daily in the United States. However, while the demand for gasoline remains high, its supply is limited, which in turn, drives up the price of gasoline. Companies within the transportation industry, such as rental car companies, sometimes lose their investment in gasoline as cars within their fleets are sold with the gasoline still intact. Moreover, because gasoline is a toxic substance, storage and destruction of discarded vehicles having gasoline in their tanks poses environmental and safety hazard.

It would be an advance in the art of transportation and environmental protection to provide solutions for recovery of fuel that would otherwise be wasted or economically lost.

SUMMARY OF THE INVENTION

In certain embodiments, a computer program product for remote, bidirectional communication with an engine control unit disposed in a combustion engine vehicle comprises a computer readable program code which causes a programmable processor to request a Vehicle Identification Number (VIN) from the engine control unit. The computer program product further comprises a computer readable program code which causes the programmable processor to receive and store the VIN.

In certain embodiments, a computer program product for remote, bidirectional communication with an engine control unit disposed in a combustion engine vehicle comprises a computer readable program code which causes a programmable processor to request diagnostic data about the combustion engine vehicle. The computer program product further comprises a computer readable program code which causes the programmable processor to receive and store the diagnostic data.

In certain embodiments, a remote computing device comprising a processor and a non-transitory computer readable medium having computer readable program code disposed therein for bidirectional communication with an engine control unit disposed in a combustion engine vehicle. The computer readable program code comprising a series of computer readable program establish communication between the processor and the engine control unit that controls a fuel pump disposed in the vehicle. The computer readable program code further comprising a series of computer readable program to cause the fuel pump to continuously pump fuel from a fuel tank disposed in the vehicle.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
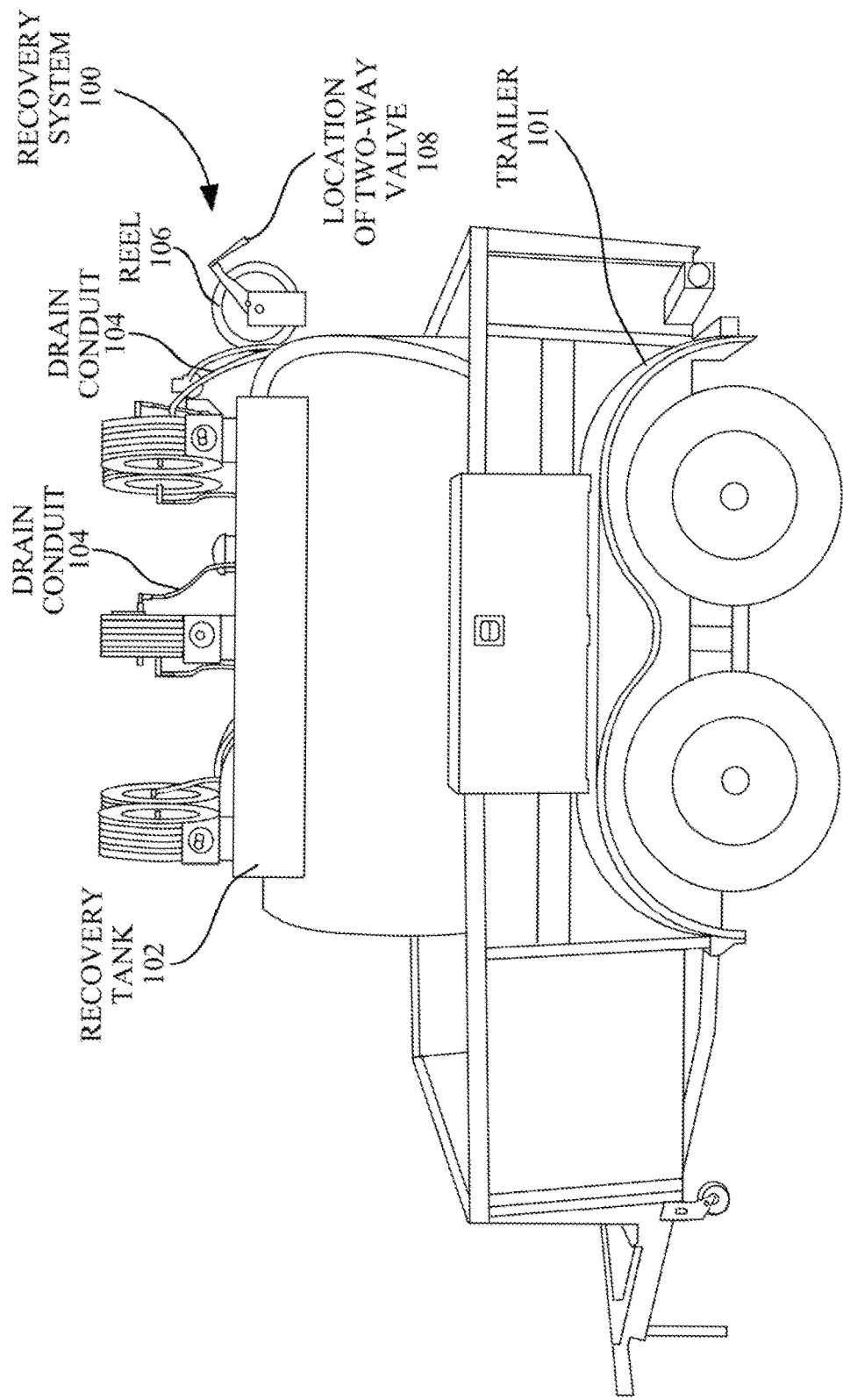
FIG. 1 is an illustration of a mobile system that can be used in the recovery of fuel from one or more vehicles, in accordance with the principles of the present invention.
Figure 2:
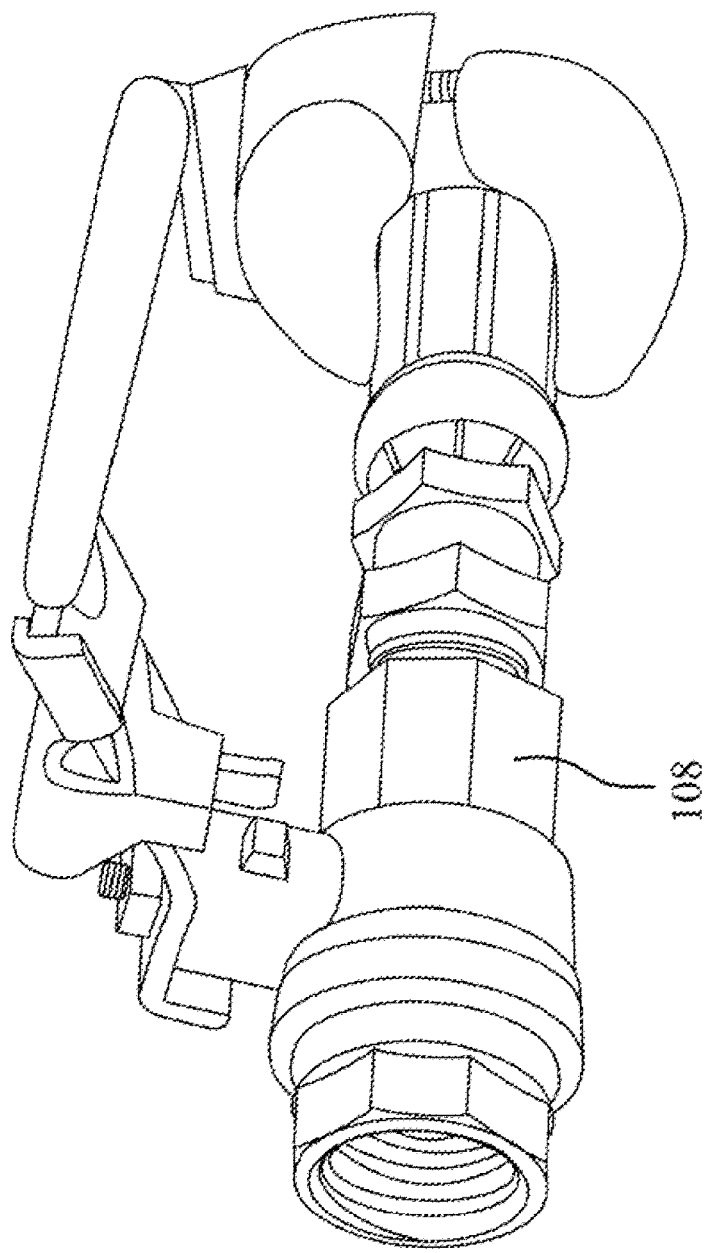
FIG. 2 is an illustration of a drain conduit with a two way valve and a fitting, for use with an apparatus and method according to the principles of the present invention.

The invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Gasoline is a toxic petroleum based liquid that is used as a fuel in combustion engines. The toxic nature of gasoline is due, in part, to the Volatile Organic Compounds (VOCs) and Hazardous Air Pollutants (HAPs) in the fuel. VOCs have a tendency to readily evaporate at environmental temperatures creating airborne particulates that are hazardous to people, animals, and the environment. HAPs are air pollutants that are expected to cause adverse environmental effects. For example, methane in gasoline is a greenhouse gas that is about 72 times stronger than carbon dioxide and when released into the atmosphere, it contributes to ozone formation.

The devastating effect of gasoline on the environment is particularly felt at vehicle salvage yards in which automobiles with gasoline filled tanks sit idle for long periods of time or are destroyed. A 2006 study by the Colorado Department of Public Health and Environment showed that release of vehicle fluids is one of the most common causes of environmental damage found at automobile salvage yards. Although many modern vehicles have an evaporative emissions control system that reduces evaporation of gasoline into the atmosphere, the evaporation is not halted. Consequently, when vehicles are not being used, such as at junkyards, the gasoline in the tanks of the vehicles is wasted as it leaks into the environment at a rate that depends on the ambient temperature. The hazardous risks and environmental damage is compounded when a vehicle is destroyed with the gasoline still in its tank. Here, as the tank of the vehicle is crushed, the volatile and combustible gasoline spills unto the proximate soil possibly leaching into groundwater, evaporating as air pollution, or causing an explosion.

Fuel recovery supports energy conservation, reduces hazardous or toxic waste destruction or contamination into the atmosphere, and promotes safety because fuel is removed from vehicles that pose such hazards. In certain embodiments, fuel is recovered from one or more combustion engines, such as combustion engines of airplanes, motor vehicles, motor cycles, lawnmowers, and the like. Particularly, part or all fuel is recovered from a system in which fuel is normally pumped to an engine in a vehicle fuel system.

Figure 3:
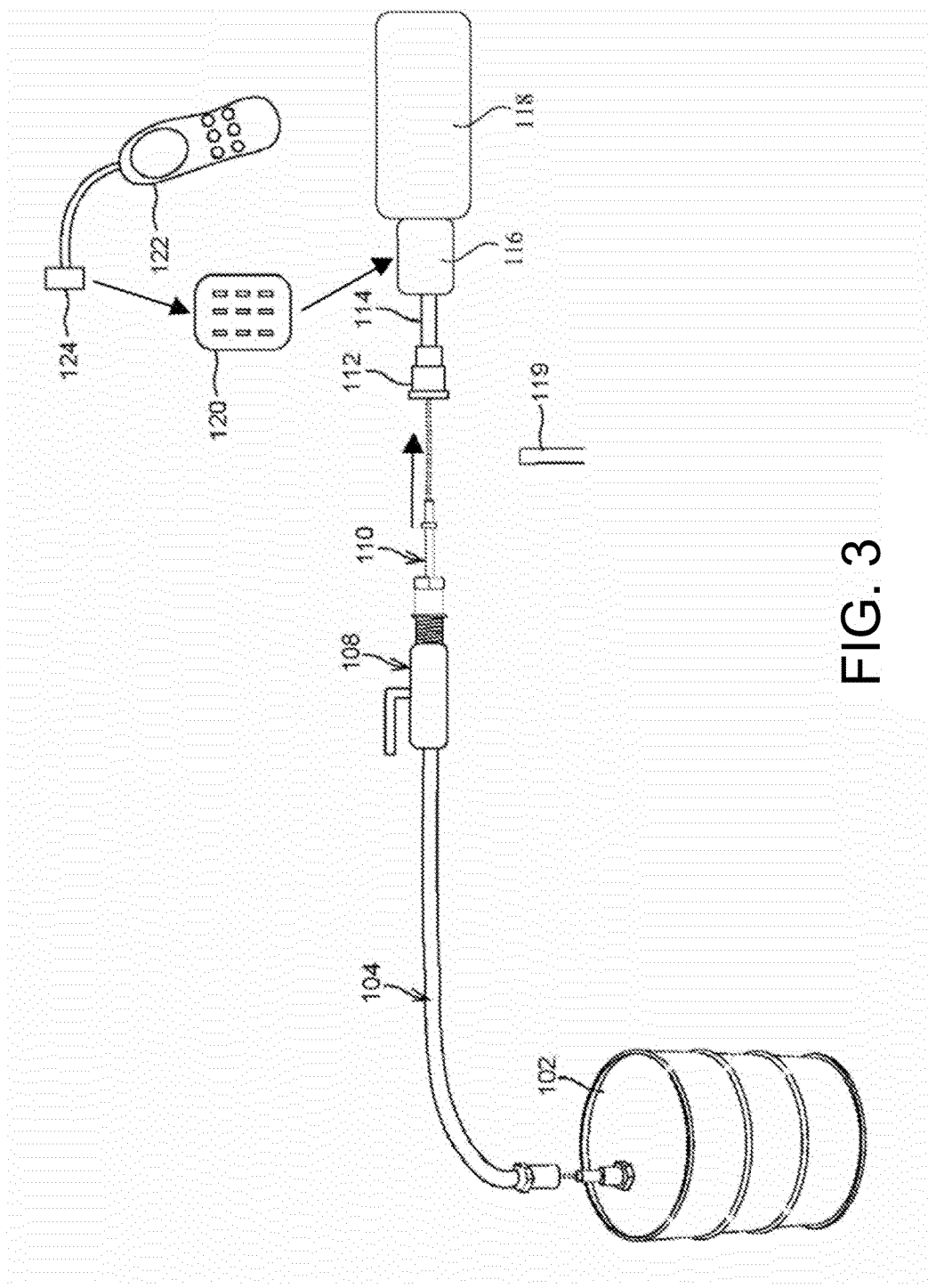
FIG. 3 is a schematic illustration of the basic structure and principles by which fuel is drained from a vehicle, according to the principles of the present invention.

Referring to FIG. 1, a recovery system 100 is shown, which is carried by a trailer 101. A fuel recovery container 102 (sometimes referred to as a storage container) is carried by the trailer, and fuel recovered from the vehicles, for example, is delivered to the fuel recovery container 102. A series of drain conduits 104 are connected with the fuel recovery container 102 (via a distribution/injector structure described below and shown in FIG. 4). Each drain conduit 104 is supported on a reel 106 that enables the drain conduit to be extended when it is being used to recover fuel from a vehicle. As shown in FIG. 3, at the distal end of the drain conduit 104 there is a two way valve 108, with a fitting that enables a tip 110 to be coupled to the two way valve (preferably via a threaded connection).

The tip 110 has a configuration that is similar to the configuration of a tip that would normally connect a fuel rail 119 of a vehicle to a fitting 112 of a fuel line 114. The tip 110 has an internal conduit to produce fluid flow through the tip. The fuel line 114 is connected with a fuel pump 116 that draws fuel from a tank, such as fuel tank 118, and normally pumps the fuel to the fuel rail 119 of the vehicle.

Referring now to FIGS. 1-3 and 5. In normal operation of the vehicle, when the ignition switch is turned on, the fuel pump 116 is actuated (by an electrical signal), the engine (not shown) is turned on, and fuel is pumped from the fuel tank 118, to the vehicle combustion engine via a connection between the fuel line 114 and the fuel rail 119. When the vehicle is not operating (the engine is not running), and it is desired to recover fuel from the vehicle fuel tank 118 and fuel line 114, the fuel rail 119 is disconnected from the fuel line 114 (see block 130 in FIG. 5). The fuel recovery system is connected to the fuel line by coupling the tip 110 to the two way valve 108 directly to the fitting 112 on the fuel line 114, so that a single conduit is established directly from the fuel line to the drain conduit 104 (see 132, 134 in FIG. 5). An external fuel pump controller 122 is coupled to a fuel pump or to an on-board computing device ("engine control unit"), such as an internal fuel pump controller, via On-Board Diagnostics ("OBD") port of the vehicle, such as the OBD2 port 120 of the vehicle.

In certain embodiments, a signal from an OBD2 port can cause a fuel pump to operate for up to three seconds only. This three second time interval is sufficient to determine a fuel pressure, and to report a fuel pressure that the fuel pump is capable of generating. Applicants' external fuel pump controller 122 utilizes computer readable code to override that three second limitation, and to cause the fuel pump to operate continuously. In certain embodiments, Applicants' computer readable program code overrides instructions encoded in the OBD2 port assembly. In certain embodiments, Applicants' computer readable program code overrides instructions encoded in an internal fuel pump controller resident in the vehicle.

The controller 122 is initiated by a switch 124, and initiates a circuit connection between the external fuel pump controller 122 and the fuel pump 116, to turn on the fuel pump 116, without turning on the vehicle engine. The fuel pump 116 initiates fuel flow in the fuel line 114, and the single conduit directs the fuel directly to the drain conduit 104 and to the container 102, bypassing the fuel rail 119, and without starting the engine (see 136, 138 in FIG. 5). In certain embodiments, fuel recovered from the fuel tank 118 of a vehicle is stored in a container 102 that has the same type of fuel that is in the fuel tank 118. For example, unleaded fuel recovered from the fuel tank 118 is stored in a container 102 that is for unleaded fuel or fuel in the fuel tank 118 with a % of ethanol is stored in a container 102 that is for fuel with a similar type of % of ethanol.

The duration of time to recover the fuel varies by the make or model of the vehicle and by the capacity of the fuel pump 116. In certain embodiments, the fuel pump 116 is operated below full capacity. In other embodiments, the fuel pump 116 is operated at near full capacity reducing the amount of time to recover the fuel from the fuel tank 118. For example, when the fuel pump 116 of a four cylinder combustion engine is operated at near full capacity, the fuel from the fuel tank of the vehicle is recovered at 2-3 gallons/minute.

Thus, fuel is recovered from a fuel supply system (e.g. a vehicle fuel system) in which fuel is normally directed, under pressure from the fuel pump to an engine (generally via the fuel rail that is connected directly to a fuel supply line). The fuel is recovered, for example, by connecting the drain conduit to the fuel line in a manner that establishes a single fluid conduit from the fuel line to the drain conduit, which bypasses the fuel rail and the engine, and initiating operation of the fuel pump (without starting the engine), to cause the fuel pump to pump fuel in the fuel line directly to the drain conduit. Thus, fuel is drained to the drain conduit, by operating the fuel pump without starting the engine, and draining fuel through the single conduit, while bypassing the fuel rail and the engine.

Figure 4:
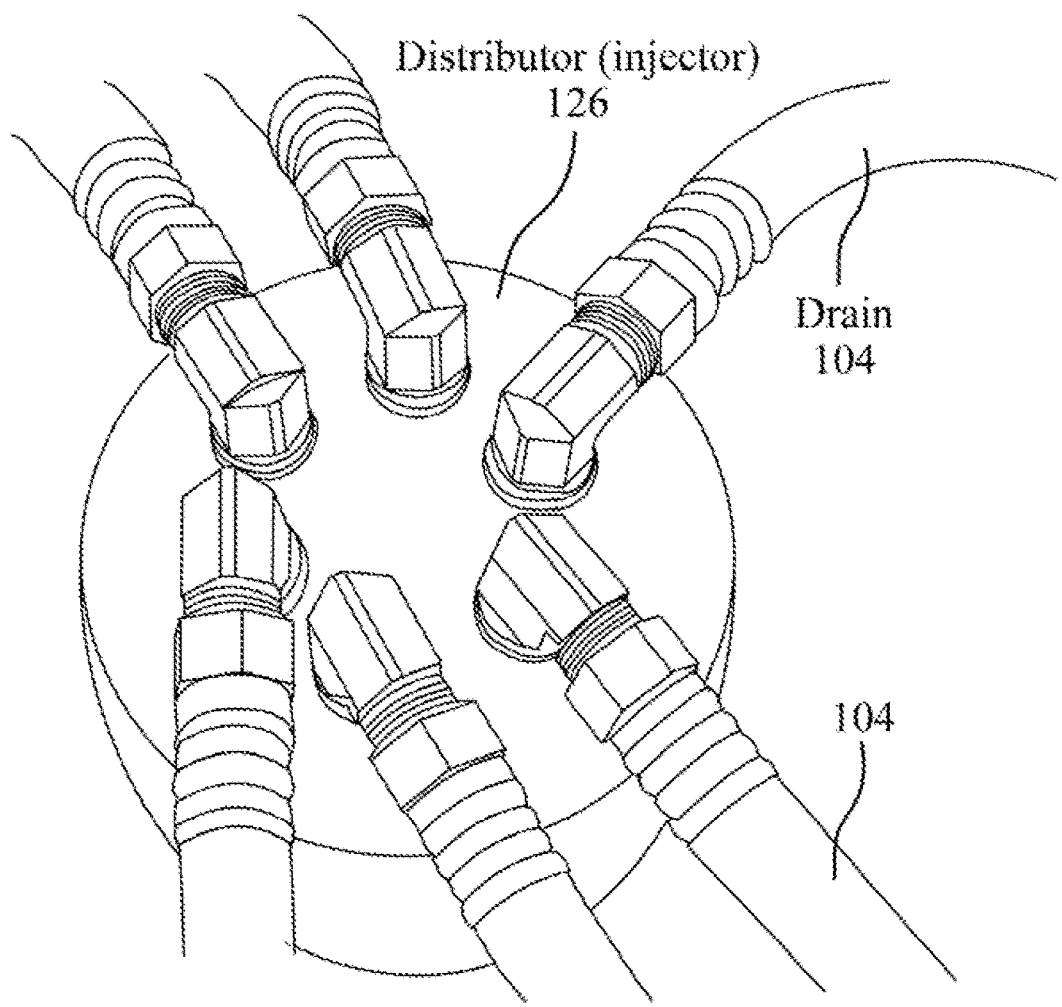
FIG. 4 is an illustration of a portion of a system that can be used in draining fuel from a plurality of vehicles, according to the principles of the present invention.

In certain embodiments, the external fuel pump controller 122 turns the fuel pump 116 on and off, without turning on the vehicle engine, to recover a predetermined (e.g., predefined) amount of fuel from the tank 118 of the vehicle. For example, the external fuel pump controller 122 is programmed to turn on the fuel pump 116 to initiate fuel flow from the tank 118 then turn off the fuel pump 116 after a predetermined amount of fuel (e.g., 3 Gallons) is recovered from the tank 118. In other embodiments, the predetermined amount of fuel is a percentage of the fuel in the tank 118 prior to recovery. Additional comments on an example of a trailer that can be used in recovering fuel from one or more vehicles, in accordance with the principles of the present invention:

a. The trailer 101 is preferably a dual 3500# axle trailer equipped with G rated radial tires and electric brakes.

b. The fuel recovery container 102, which receives and stores recovered fuel, is preferably a UL 142 listed and approved 500 gallon all steel fuel storage tank custom built by Tyco manufacturing in Tucson, Ariz.

c. The trailer 101 preferably includes safety features such as electric brakes, a break-away system, grated steel safety platform for easy access to the trailer, and flip away heavy duty trailer jack assembly. The trailer includes required federally mandated pressure relief valves for proper release of fuel vapors. Moreover, the trailer would be equipped with stage one vapor recovery units installed to insure compliance with the new stricter EPA regulations. In addition, the trailer is provided with two vapor tubes, the first is for use while the unit is being transported to and from a facility at which it is used, the second additional vent tube for use while in operation.

d. The reels 106 are preferably UL listed anti-static reels.

e. The trailer 101 may include a pump for dispensing fuel directly from the storage tank. The pump would preferably be a UL listed explosion proof pump with electrical connectors.

f. All tanks on the trailer come equipped with an accurate fuel level sight glass for easy recognition of fuel levels within the tank.

g. The fuel distribution/injection system is designed to enable fuel to be recovered from several vehicles. The fuel distribution system (also referred to as the injection system) safely transfers the fuel from the vehicles from which fuel is being recovered to the tank. FIG. 4 shows the distributor 126 that distributes fuel from several drain conduits 104 to the recovery container 102.

h. Fuel can be recovered from a vehicle through the tip(s) 110, that are specially produced to properly and securely fit into the fittings 112 of the fuel lines of different vehicle types in a leak proof manner, and each of which includes a fuel grade locking ball valve to prevent a fuel spill from occurring. This secure fit reduces emission of Volatile Organic Compounds into the atmosphere.

i. One or more solar panels may be installed on the trailer to power the unit. This eliminates the need for an internal combustion engine as the power source. Power from the solar panel(s) is stored in an onboard deep cycle battery in a sealed compartment. All connections in the electrical system are made using explosion proof UL listed connectors.

j. The trailer is DOT certified, with 4 fire extinguishers, all required information placards, and reflective DOT tape. One of the four onboard fire extinguishers is strategically placed in an appropriate location to address the unlikely case of an incident. The trailer also has a box of reflective triangles in case of a roadside emergency as required by the DOT. The trailer also includes spill kits that are preferably larger than standard spill kits on a semi-truck tanker, and include containment rings, spill diapers, safety goggles, rubber gloves, and clean-up disposal bag. The trailer includes a 5 gallon fire bucket for safe storage of used rags. The two way value 108 is preferably a solid brass corrosion proof two way valve on the drain conduit 104 to control the flow of recovered fuel being deposited into the fuel recovery container 102.

k. The trailer has a stage one vapor recovery system designed to make the fuel recovery system compliant in all 50 United States and Canada. The trailer is also equipped with a dual purpose delivery and vapor recovery collar. This collar enables the operator to simultaneously deliver fuel and recover vapors in one step. The collar is also universal to fit older as well as newer tank coupling styles. Manual lock handles, easy carry handle, oversize gaskets, and a sight glass are standard on delivery collars. Dual purpose collar with delivery hose and vapor recovery hose attached are also provided.

Figure 6:
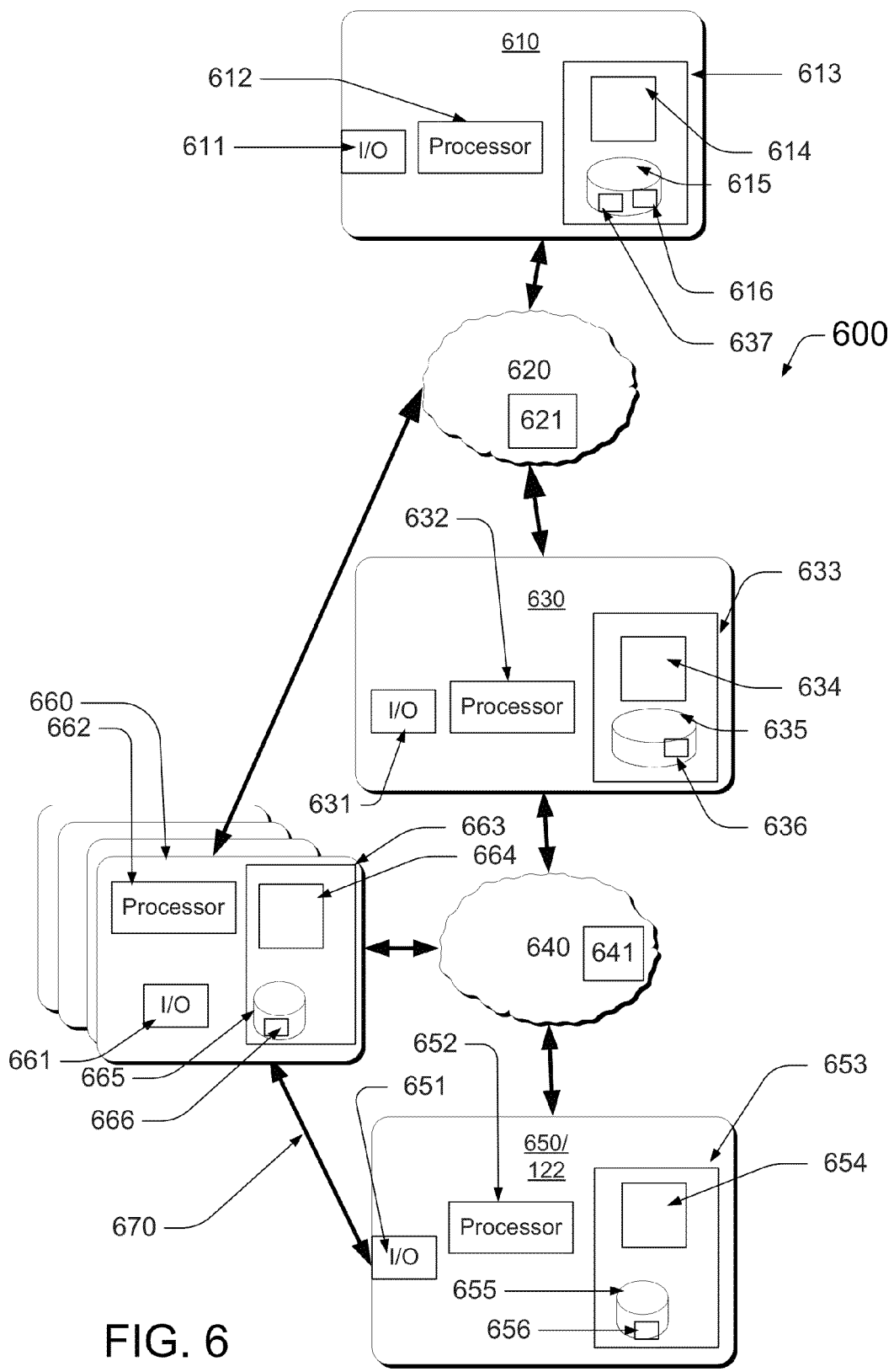
FIG. 6 is illustrates an exemplary embodiment of Applicants' fuel recovery system.

Referring to FIG. 6, a system 600 for remote, bidirectional communication with an engine control unit disposed in a combustion engine vehicle is illustrated. In certain embodiments, one or more computing devices 610, 630, and 650 (e.g., pump controller 122 of FIG. 3) are communicatively coupled for bidirectional communication with one or more on-board computing devices 660 (sometimes referred to as "engine control unit") via an OBD2 port 120 of corresponding one or more vehicles having corresponding combustion engines. To illustrate, the remote computing device 610 is server remote (e.g., more than 100 feet) from, and communicatively coupled to, one or more vehicles each with corresponding on-board computing devices 660 via a first communication fabric 620. For example, the computing device 610 is communicatively coupled to each of 500 vehicles each with corresponding on-board computing devices 660 via a cellular or a far field communication network. In another illustration, in certain embodiments, the computing device 630 is communicatively coupled to one or more vehicles each with corresponding on-board computing devices 660 via a second communication fabric 640. For example, the external fuel pump controller 122 is wirelessly connected to each of 30 vehicles each with corresponding on-board computing devices 660 via an intranet. In yet another illustration, in certain embodiments, the external fuel pump controller 122 is communicatively coupled to one or more vehicles each with corresponding on-board computing devices 660 via a second communication fabric 640 or via a direction connection 670. For example, the external fuel pump controller 122 is electronically connected to each of ten vehicles each with corresponding on-board computing devices 660 via a wired connection.

In the illustrated embodiment of FIG. 6, the computing device 630 is communicatively connected to the computing device 610 through the first communication fabric 620 and the external fuel pump controller 122 through the second communication fabric 640.

In certain embodiments, the computing device 610 is a computing device that is owned and/or operated by a first entity/person. Examples of the first person are a host, a vehicle data provider, or a regional or national rental fleet company. In certain embodiments, the computing device 630 is owned and/or operated by a second entity/person such as a rental car facility and the external fuel pump controller 650 (e.g., 122) is owned and/or operated by a third entity/person, such as a mechanic employed by the rental car facility.

In certain embodiments, one or more of the computing devices 610, 630, and 650 are the same computing device. \For example, the computing device 610, operated by the host, is also the computing devices 630 and 650 and the communication fabrics 630 and 640 are the same communication fabric. In another example, the external fuel pump controller 122 is the computing device 630 owned and/or operated rental car facility.

For the sake of clarity, FIG. 6 shows a single computing device 610, computing device 630, and external fuel pump controller 122. FIG. 6 should not be taken as limiting. Rather, in other embodiments any number of entities and corresponding devices can be part of the system 600, and further, although FIG. 6 shows two communication fabrics 620 and 640, in other embodiments less or more than two communication fabrics is provided in the system 600. For example, in certain embodiments, the communication fabric 620 and the communication fabric 640 are the same communication fabric.

In certain embodiments, the computing devices 610, 630, and 650 are each an article of manufacture. Examples of the article of manufacture include: a server, a mainframe computer, a mobile telephone, a smart phone, a personal digital assistant, a personal computer, a laptop, a set-top box, an MP3 player, an email enabled device, a tablet computer, or a web enabled device having one or more processors (e.g., a Central Processing Unit, a Graphical Processing Unit, programmable processor, and/or a microprocessor) that is configured to execute an algorithm (e.g., a computer readable program or software) to receive data, transmit data, store data, or performing methods or other special purpose computer, for example.

By way of illustration and not limitation, FIG. 6 illustrates the computing device 610, the computing device 630, the external fuel pump controller 122, and the computing device 660 as each including: a processor (612, 632, 652, and 662 respectively); a non-transitory computer readable medium (613, 633, 653, and 663 respectively) having a series of instructions, such as computer readable program steps encoded therein; an input/output means (611, 631, 651, and 661 respectively) such as a keyboard, a mouse, a stylus, touch screen, a receiver, a transmitter, a transceiver, a camera, a scanner, or a printer. The non-transitory computer readable mediums 613, 633, 653, and 663 each include corresponding computer readable program codes (614, 634, 654, and 664 respectively) and data repositories (615, 635, 655, and 665 respectively). The processors 612, 632, 652, and 662 access corresponding computer readable program codes (614, 634, 654, and 664 respectively), encoded on the corresponding non-transitory computer readable mediums (613, 633, 653, and 663 respectively), and executes one or more corresponding instructions (616, 636, 656, and 666 respectively).

In certain embodiments, the functions of a processor, and a computer readable medium, and computer readable program code encoded in the computer readable medium, are integrated in a unitary assembly, such as for example and without limitation, an application specific integrated circuit ("ASIC"). In these ASIC embodiments, processor 612, computer readable medium 613, and computer readable program code 614, are present in a single ASIC. Such an ASIC may be used in external fuel pump controller 122 and/or any one of the computing devices 660, 630, and/or 610.

In one example, the processors 632 and 652 access corresponding Application Program Interfaces (APIs) encoded on the corresponding non-transitory computer readable mediums (633 and 653, respectively), and executes instructions (e.g., 636 and 656, for example, respectively) to electronically communicate with the computing device 610. Similarly, the processor 612 accesses the computer readable program code 614, encoded on the non-transitory computer readable medium 613, and executes an instruction 616 to electronically communicate with the computing device 630 via the communication fabric 620 or electronically communicate with the external fuel pump controller 122 via another communication fabric (not shown). A log 637 is maintained of the data communicated or information about the data communicated (e.g., date and time of transmission, frequency of transmission . . . etc.) with any or all of the computing device 630, the external fuel pump controller 122, and the computing device 660. In certain embodiments, the log 637 is analyzed and/or mined.

In certain embodiments, the data repositories 615, 635, 655, and 665 each comprises one or more hard disk drives, tape cartridge libraries, optical disks, combinations thereof, and/or any suitable data storage medium, storing one or more databases, or the components thereof, in a single location or in multiple locations, or as an array such as a Direct Access Storage Device (DASD), redundant array of independent disks (RAID), virtualization device, . . . etc. In certain embodiments, one or more of the data repositories 615, 635, 655, and 665 is structured by a database model, such as a relational model, a hierarchical model, a network model, an entity-relationship model, an object-oriented model, or a combination thereof. For example, in certain embodiments, the data repository 615 is structured in a relational model and stores an amount of fuel actually recovered from a plurality of vehicles in a matrix.

In certain embodiments, the computing devices 610, 630, 650, and 660 include wired and/or wireless communication devices which employ various communication protocols including near field (e.g., "Blue Tooth" or Infrared wireless signals) and/or far field communication capabilities (e.g., satellite communication or communication to cell sites of a cellular network) that support any number of services such as: Short Message Service (SMS) for text messaging, Multimedia Messaging Service (MMS) for transfer of photographs and videos, electronic mail (email) access, or Global Positioning System (GPS) service, for example.

As illustrated in FIG. 6, the communication fabrics 620 and 640 each comprise one or more switches 621 and 641, respectively. In certain embodiments, at least one of the communication fabrics 620 and 640 comprises the Internet, an intranet, an extranet, a storage area network (SAN), a wide area network (WAN), a local area network (LAN), a virtual private network, a satellite communications network an interactive television network, or any combination of the foregoing.

In certain embodiments, at least one of the communication fabrics 620 or 640 or communication link 670 contains either or both wired or wireless connections for the transmission of signals including electrical connections, magnetic connections, or a combination thereof. Examples of these types of connections include: radio frequency connections, optical connections, telephone links, a Digital Subscriber Line, or a cable link. Moreover, communication fabrics 620 or 640 or communication link 670 utilize any of a variety of communication protocols, such as Transmission Control Protocol/Internet Protocol (TCP/IP), for example.

In some embodiments, at least one or more portions of the system 600 can be implemented as a software and/or hardware module that can be locally and/or remotely executed on one or more of the computing devices 610, 630, and 650. For example, one or more portions of the system 600 can include a hardware-based module (e.g., a digital signal processor (DSP), a field programmable gate array (FPGA)) and/or a software-based module (e.g., a module of computer code or a set of processor-readable instructions that can be executed at a processor).

In certain embodiments, at least one of the computing devices 610, 630 and 650 (e.g., external fuel pump controller 122) is configured to send and/or receive signals from an on-board computing device 660 via an OBD2 port 120. For example, referring to FIGS. 3 and 6, in certain embodiments, the computing device 610 operated by the host is configured to form and receive transmissions from the computing device 660. Here, the computing device 610 receives diagnostic data from, and sends requests or instructions to, the on-board computing device 660. To illustrate, the computing device 610 sends instructions to the on-board computing device 660 to continuously operating the fuel pump 116 of the combustion engine, without starting the combustion engine, to recover all fuel disposed in the tank 118.

In certain embodiments, one or more of the computing devices 610, 630, and 650 is configured to receive information from the on-board computing device 660 of the vehicle. For example, the computing device 610 receives information about the vehicle that is stored in the data repository 665 of the on-board computing device 660 or determined through a diagnostic process performed by the on-board computing device 660. Examples of information received from the on-board computing device 660 include the Vehicle Identification Number (VIN); make or model; year of manufacture of the vehicle; or information from the OBD2 of the vehicle which has self-diagnostic and reporting capabilities, such as an amount of fuel left in the tank of the vehicle, or the type of fuel left in the tank of the vehicle.

To illustrate, in certain embodiments, the computing device 610 sends standardized Parameter ID (PID) codes to the OBD2 of vehicles in order to receive a response that includes diagnostic data. The table below shows the standard OBD2 PIDs as defined by SAE J1979 and the expected response of the OBD2 of the on-board computing device 660 for each PID to the computing device 610.

| Mode (hex) | PID (hex) | Data bytes returned | Description | Min value | Max value | Units | Formula |
|---|---|---|---|---|---|---|---|
| 1 | 0 | 4 | PIDs supported [01-20] | | | | Bit encoded [A7 . . . D0] == [PID 0x01 . . . PID 0x20] |
| 1 | 1 | 4 | Monitor status since DTCs cleared. (Includes malfunction indicator lamp (MIL) status and number of DTCs.) | | | | Bit encoded. |
| 1 | 2 | 2 | Freeze DTC | | | | |
| 1 | 3 | 2 | Fuel system status | | | | Bit encoded. |
| 1 | 4 | 1 | Calculated engine load value | 0 | 100 | % | A * 100/255 |
| 1 | 5 | 1 | Engine coolant temperature | −40 | 215 | ° C. | A − 40 |
| 1 | 6 | 1 | Short term fuel % trim—Bank 1 | −100 (Rich) | 99.22 (Lean) | % | (A − 128) * 100/128 |
| 1 | 7 | 1 | Long term fuel % trim—Bank 1 | −100 (Lean) | 99.22 (Rich) | % | (A − 128) * 100/128 |
| 1 | 8 | 1 | Short term fuel % trim—Bank 2 | −100 (Lean) | 99.22 (Rich) | % | (A − 128) * 100/128 |
| 1 | 9 | 1 | Long term fuel % trim—Bank 2 | −100 (Lean) | 99.22 (Rich) | % | (A − 128) * 100/128 |
| 1 | 0A | 1 | Fuel pressure | 0 | 765 | kPa (gauge) | A * 3 |
| 1 | 0B | 1 | Intake manifold absolute pressure | 0 | 255 | kPa (absolute) | A |
| 1 | 0C | 2 | Engine RPM | 0 | 16,383.75 | rpm | ((A * 256) + B)/4 |
| 1 | 0D | 1 | Vehicle speed | 0 | 255 | km/h | A |
| 1 | 0E | 1 | Timing advance | −64 | 63.5 | ° relative to #1 cylinder | A/2 − 64 |
| 1 | 0F | 1 | Intake air temperature | −40 | 215 | ° C. | A − 40 |
| 1 | 10 | 2 | MAF air flow rate | 0 | 655.35 | grams/sec | ((A * 256) + B)/100 |
| 1 | 11 | 1 | Throttle position | 0 | 100 | % | A * 100/255 |
| 1 | 12 | 1 | Commanded secondary air status | | | | Bit encoded. |
| 1 | 13 | 1 | Oxygen sensors present | | | | [A0 . . . A3] == Bank 1, Sensors 1-4. [A4 . . . A7] == Bank 2 . . . |
| 1 | 14 | 2 | Bank 1, Sensor 1: Oxygen sensor voltage, | 0 | 1.275 | Volts % | A/200 (B − 128) * 100/128 (if B == 0xFF, sensor is not used in trim calc) |

-continued

| Mode (hex) | PID (hex) | Data bytes returned | Description | Min value | Max value | Units | Formula |
|---|---|---|---|---|---|---|---|
| | | | Short term fuel trim | −100 (lean) | 99.2 (rich) | | |
| 1 | 15 | 2 | Bank 1, Sensor 2: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 16 | 2 | Bank 1, Sensor 3: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 17 | 2 | Bank 1, Sensor 4: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 18 | 2 | Bank 2, Sensor 1: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 19 | 2 | Bank 2, Sensor 2: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 1A | 2 | Bank 2, Sensor 3: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 1B | 2 | Bank 2, Sensor 4: Oxygen sensor voltage, | 0 | 1.275 | Volts % | A/200 (B − 128) * 100/128 (if B == 0xFF, sensor is not used in trim calc) |
| | | | Short term fuel trim | −100 (lean) | 99.2 (rich) | | |
| 1 | 1C | 1 | OBD standards this vehicle conforms to | | | | Bit encoded. |
| 1 | 1D | 1 | Oxygen sensors present | | | | Similar to PID 13, but [A0 . . . A7] == [B1S1, B1S2, B2S1, B2S2, B3S1, B3S2, B4S1, B4S2] |

-continued

| Mode (hex) | PID (hex) | Data bytes returned | Description | Min value | Max value | Units | Formula |
|---|---|---|---|---|---|---|---|
| 1 | 1E | 1 | Auxiliary input status | | | | A0 == Power Take Off (PTO) status (1 == active) [A1 . . . A7] not used |
| 1 | 1F | 2 | Run time since engine start | 0 | 65,535 | sec. | (A * 256) + B |
| 1 | 20 | 4 | PIDs supported 21-40 | | | | Bit encoded [A7 . . . D0] == [PID 0x21 . . . PID 0x40] |
| 1 | 21 | 2 | Distance traveled with malfunction indicator lamp (MIL) on | 0 | 65,535 | km | (A * 256) + B |
| 1 | 22 | 2 | Fuel Rail Pressure (relative to manifold vacuum) | 0 | 5177.265 | kPa | ((A * 256) + B) * 0.079 |
| 1 | 23 | 2 | Fuel Rail Pressure (diesel, or gasoline direct inject) | 0 | 655,350 | kPa (gauge) | ((A * 256) + B) * 10 |
| 1 | 24 | 4 | O2S1_WR_lambda(1): | 0 | 1.999 | N/A | ((A * 256) + B) * 2/65535 or ((A * 256) + B)/ 32768 |
| | | | Equivalence Ratio | 0 | 7.999 | V | ((C * 256) + D) * 8/65535 or ((C * 256) + D)/ 8192 |
| | | | Voltage | | | | |
| 1 | 25 | 4 | O2S2_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 26 | 4 | O2S3_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 27 | 4 | O2S4_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 28 | 4 | O2S5_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 29 | 4 | O2S6_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 2A | 4 | O2S7_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 2B | 4 | O2S8_WR_lambda(1): | 0 | 2 | N/A | ((A * 256) + B) * 2/65535 |
| | | | Equivalence Ratio | 0 | 8 | V | ((C * 256) + D) * 8/65535 |
| | | | Voltage | | | | |
| 1 | 2C | 1 | Commanded EGR | 0 | 100 | % | 100 * A/255 |
| 1 | 2D | 1 | EGR Error | −100 | 99.22 | % | (A − 128) * 100/128 |
| 1 | 2E | 1 | Commanded evaporative purge | 0 | 100 | % | 100 * A/255 |
| 1 | 2F | 1 | Fuel Level Input | 0 | 100 | % | 100 * A/255 |
| 1 | 30 | 1 | # of warm-ups since codes cleared | 0 | 255 | N/A | A |

| Mode (hex) | PID (hex) | Data bytes returned | Description | Min value | Max value | Units | Formula |
|---|---|---|---|---|---|---|---|
| 1 | 31 | 2 | Distance traveled since codes cleared | 0 | 65,535 | km | (A * 256) + B |
| 1 | 32 | 2 | Evap. System Vapor Pressure | −8,192 | 8,192 | Pa | ((A * 256) + B)/4 (A is signed) |
| 1 | 33 | 1 | Barometric pressure | 0 | 255 | kPa (Absolute) | A |
| 1 | 34 | 4 | O2S1_WR_lambda(1): | 0 | 1.999 | N/A | ((A * 256) + B)/32,768 |
|   |   |   | Equivalence Ratio | −128 | 127.99 | mA | ((C * 256) + D)/256 − 128 |
|   |   |   | Current |   |   |   |   |
| 1 | 35 | 4 | O2S2_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 36 | 4 | O2S3_WR_lambda(1): | 0 | 2 | N/A | ((A * 256) + B)/32768 |
|   |   |   | Equivalence Ratio | −128 | 128 | mA | ((C * 256) + D)/256 − 128 |
|   |   |   | Current |   |   |   |   |
| 1 | 37 | 4 | O2S4_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 38 | 4 | O2S5_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 39 | 4 | O2S6_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 3A | 4 | O2S7_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 3B | 4 | O2S8_WR_lambda(1): | 0 | 2 | N/A | ((A * 256) + B)/32,768 |
|   |   |   | Equivalence Ratio | −128 | 128 | mA | ((C * 256) + D)/256 − 128 |
|   |   |   | Current |   |   |   |   |
| 1 | 3C | 2 | Catalyst Temperature Bank 1, Sensor 1 | −40 | 6,513.50 | ° C. | ((A * 256) + B)/10 − 40 |
| 1 | 3D | 2 | Catalyst Temperature Bank 2, Sensor 1 | −40 | 6,513.50 | ° C. | ((A * 256) + B)/10 − 40 |
| 1 | 3E | 2 | Catalyst Temperature Bank 1, Sensor 2 | −40 | 6,513.50 | ° C. | ((A * 256) + B)/10 − 40 |
| 1 | 3F | 2 | Catalyst Temperature Bank 2, Sensor 2 | −40 | 6,513.50 | ° C. | ((A * 256) + B)/10 − 40 |
| 1 | 40 | 4 | PIDs supported 41-60 |   |   |   | Bit encoded [A7 ... D0] == [PID 0x41 ... PID 0x60] |
| 1 | 41 | 4 | Monitor status this drive cycle |   |   |   | Bit encoded. |
| 1 | 42 | 2 | Control module voltage | 0 | 65.535 | V | ((A * 256) + B)/1000 |
| 1 | 43 | 2 | Absolute load value | 0 | 25,700 | % | ((A * 256) + B) * 100/255 |
| 1 | 44 | 2 | Command equivalence ratio | 0 | 2 | N/A | ((A * 256) + B)/32768 |
| 1 | 45 | 1 | Relative throttle position | 0 | 100 | % | A * 100/255 |
| 1 | 46 | 1 | Ambient air temperature | −40 | 215 | ° C. | A − 40 |
| 1 | 47 | 1 | Absolute throttle position B | 0 | 100 | % | A * 100/255 |

-continued

| Mode (hex) | PID (hex) | Data bytes returned | Description | Min value | Max value | Units | Formula |
|---|---|---|---|---|---|---|---|
| 1 | 48 | 1 | Absolute throttle position C | 0 | 100 | % | A * 100/255 |
| 1 | 49 | 1 | Accelerator pedal position D | 0 | 100 | % | A * 100/255 |
| 1 | 4A | 1 | Accelerator pedal position E | 0 | 100 | % | A * 100/255 |
| 1 | 4B | 1 | Accelerator pedal position F | 0 | 100 | % | A * 100/255 |
| 1 | 4C | 1 | Commanded throttle actuator | 0 | 100 | % | A * 100/255 |
| 1 | 4D | 2 | Time run with MIL on | 0 | 65,535 | minutes | (A * 256) + B |
| 1 | 4E | 2 | Time since trouble codes cleared | 0 | 65,535 | minutes | (A * 256) + B |
| 1 | 4F | 4 | Maximum value for equivalence ratio, oxygen sensor voltage, oxygen sensor current, and intake manifold absolute pressure | 0, 0, 0, 0 | 255, 255, 255, 2550 | , V, mA, kPa | A, B, C, D * 10 |
| 1 | 50 | 4 | Maximum value for air flow rate from mass air flow sensor | 0 | 2550 | g/s | A * 10, B, C, and D are reserved for future use |
| 1 | 51 | 1 | Fuel Type | | | | From fuel type table. |
| 1 | 52 | 1 | Ethanol fuel % | 0 | 100 | % | A * 100/255 |
| 1 | 53 | 2 | Absolute Evap system Vapour Pressure | 0 | 327,675 | kPa | 1/200 per bit |
| 1 | 54 | 2 | Evap system vapor pressure | −32,767 | 32,768 | Pa | A * 256 + B − 32768 |
| 1 | 55 | 2 | Short term secondary oxygen sensor trim bank 1 and bank 3 | −100 | 99.22 | % | (A − 128) * 100/128 (B − 128) * 100/128 |
| 1 | 56 | 2 | Long term secondary oxygen sensor trim bank 1 and bank 3 | −100 | 99.22 | % | (A − 128) * 100/128 (B − 128) * 100/128 |
| 1 | 57 | 2 | Short term secondary oxygen sensor trim bank 2 and bank 4 | −100 | 99.22 | % | (A − 128) * 100/128 (B − 128) * 100/128 |
| 1 | 58 | 2 | Long term secondary oxygen sensor trim bank 2 and bank 4 | −100 | 99.22 | % | (A − 128) * 100/128 (B − 128) * 100/128 |
| 1 | 59 | 2 | Fuel rail pressure (absolute) | 0 | 655,350 | kPa | ((A * 256) + B) * 10 |
| 1 | 5A | 1 | Relative accelerator pedal position | 0 | 100 | % | A * 100/255 |
| 1 | 5B | 1 | Hybrid battery pack remaining life | 0 | 100 | % | A * 100/255 |
| 1 | 5C | 1 | Engine oil temperature | −40 | 210 | ° C. | A − 40 |
| 1 | 5D | 2 | Fuel injection timing | −210 | 301.992 | ° | (38,655 − ((A * 256) + B))/128 |
| 1 | 5E | 2 | Engine fuel rate | 0 | 3212.75 | L/h | ((A * 256) + B) * 0.05 |
| 1 | 5F | 1 | Emission requirements to which vehicle is designed | | | | Bit Encoded |
| 1 | 61 | 1 | Driver's demand engine—percent torque | −125 | 125 | % | A − 125 |
| 1 | 62 | 1 | Actual engine—percent torque | −125 | 125 | % | A − 125 |
| 1 | 63 | 2 | Engine reference torque | 0 | 65,535 | Nm | A * 256 + B |
| 1 | 64 | 5 | Engine percent torque data | −125 | 125 | % | A − 125 Idle B − 125 Engine point 1 C − 125 |

-continued

| Mode (hex) | PID (hex) | Data bytes returned | Description | Min value | Max value | Units | Formula |
|---|---|---|---|---|---|---|---|
| | | | | | | | Engine point 2 D – 125 Engine point 3 E – 125 Engine point 4 Bit Encoded |
| 1 | 65 | 2 | Auxiliary input/output supported | | | | |
| 1 | 66 | 5 | Mass air flow sensor | | | | |
| 1 | 67 | 3 | Engine coolant temperature | | | | |
| 1 | 68 | 7 | Intake air temperature sensor | | | | |
| 1 | 69 | 7 | Commanded EGR and EGR Error | | | | |
| 1 | 6A | 5 | Commanded Diesel intake air flow control and relative intake air flow position | | | | |
| 1 | 6B | 5 | Exhaust gas recirculation temperature | | | | |
| 1 | 6C | 5 | Commanded throttle actuator control and relative throttle position | | | | |
| 1 | 6D | 6 | Fuel pressure control system | | | | |
| 1 | 6E | 5 | Injection pressure control system | | | | |
| 1 | 6F | 3 | Turbocharger compressor inlet pressure | | | | |
| 1 | 70 | 9 | Boost pressure control | | | | |
| 1 | 71 | 5 | Variable Geometry turbo (VGT) control | | | | |
| 1 | 72 | 5 | Wastegate control | | | | |
| 1 | 73 | 5 | Exhaust pressure | | | | |
| 1 | 74 | 5 | Turbocharger RPM | | | | |
| 1 | 75 | 7 | Turbocharger temperature | | | | |
| 1 | 76 | 7 | Turbocharger temperature | | | | |
| 1 | 77 | 5 | Charge air cooler temperature (CACT) | | | | |
| 1 | 78 | 9 | Exhaust Gas temperature (EGT) Bank 1 | | | | Special PID. |
| 1 | 79 | 9 | Exhaust Gas temperature (EGT) Bank 2 | | | | Special PID. |
| 1 | 7A | 7 | Diesel particulate filter (DPF) | | | | |
| 1 | 7B | 7 | Diesel particulate filter (DPF) | | | | |
| 1 | 7C | 9 | Diesel Particulate filter (DPF) temperature | | | | |
| 1 | 7D | 1 | NOx NTE control area status | | | | |
| 1 | 7E | 1 | PM NTE control area status | | | | |
| 1 | 7F | 13 | Engine run time | | | | |
| 1 | 81 | 21 | Engine run time for AECD | | | | |
| 1 | 82 | 21 | Engine run time for AECD | | | | |
| 1 | 83 | 5 | NOx sensor | | | | |
| 1 | 84 | | Manifold surface temperature | | | | |
| 1 | 85 | | NOx reagent system | | | | |
| 1 | 86 | | Particulate matter (PM) sensor | | | | |
| 1 | 87 | | Intake manifold absolute pressure | | | | |

| Mode (hex) | PID (hex) | Data bytes returned | Description | Min value | Max value | Units | Formula |
|---|---|---|---|---|---|---|---|
| 1 | C3 | ? | ? | ? | ? | ? | Returns numerous data, including Drive Condition ID and Engine Speed* |
| 1 | C4 | ? | ? | ? | ? | ? | B5 is Engine Idle Request B6 is Engine Stop Request* |
| 2 | 2 | 2 | Freeze frame trouble code | | | | BCD encoded. |
| 3 | N/A | n * 6 | Request trouble codes | | | | 3 codes per message frame, BCD encoded. |
| 4 | N/A | 0 | Clear trouble codes/ Malfunction indicator lamp (MIL)/Check engine light | | | | Clears all stored trouble codes and turns the MIL off. |
| 5 | 100 | | OBD Monitor IDs supported ($01-$20) | | | | |
| 5 | 101 | | O2 Sensor Monitor Bank 1 Sensor 1 | 0 | 1.275 | Volts | 0.005 Rich to lean sensor threshold voltage |
| 5 | 102 | | O2 Sensor Monitor Bank 1 Sensor 2 | 0 | 1.275 | Volts | 0.005 Rich to lean sensor threshold voltage |
| 5 | 103 | | O2 Sensor Monitor Bank 1 Sensor 3 | 0 | 1.275 | Volts | 0.005 Rich to lean sensor threshold voltage |
| 5 | 104 | | O2 Sensor Monitor Bank 1 Sensor 4 | 0 | 1.275 | Volts | 0.005 Rich to lean sensor threshold voltage |
| 5 | 105 | | O2 Sensor Monitor Bank 2 Sensor 1 | 0 | 1.275 | Volts | 0.005 Rich to lean sensor threshold voltage |
| 5 | 106 | | O2 Sensor Monitor Bank 2 Sensor 2 | 0 | 1.275 | Volts | 0.005 Rich to lean sensor threshold voltage |
| 5 | 107 | | O2 Sensor Monitor Bank 2 Sensor 3 | 0 | 1.275 | Volts | 0.005 Rich to lean sensor threshold voltage |
| 5 | 108 | | O2 Sensor Monitor Bank 2 Sensor 4 | 0 | 1.275 | Volts | 0.005 Rich to lean sensor threshold voltage |
| 5 | 109 | | O2 Sensor Monitor Bank 3 Sensor 1 | 0 | 1.275 | Volts | 0.005 Rich to lean sensor threshold voltage |
| 5 | 010A | | O2 Sensor Monitor Bank 3 Sensor 2 | 0 | 1.275 | Volts | 0.005 Rich to lean sensor |

-continued

| Mode (hex) | PID (hex) | Data bytes returned | Description | Min value | Max value | Units | Formula |
|---|---|---|---|---|---|---|---|
| 5 | 010B | | O2 Sensor Monitor Bank 3 Sensor 3 | 0 | 1.275 | Volts | 0.005 Rich to lean sensor threshold voltage |
| 5 | 010C | | O2 Sensor Monitor Bank 3 Sensor 4 | 0 | 1.275 | Volts | 0.005 Rich to lean sensor threshold voltage |
| 5 | 010D | | O2 Sensor Monitor Bank 4 Sensor 1 | 0 | 1.275 | Volts | 0.005 Rich to lean sensor threshold voltage |
| 5 | 010E | | O2 Sensor Monitor Bank 4 Sensor 2 | 0 | 1.275 | Volts | 0.005 Rich to lean sensor threshold voltage |
| 5 | 010F | | O2 Sensor Monitor Bank 4 Sensor 3 | 0 | 1.275 | Volts | 0.005 Rich to lean sensor threshold voltage |
| 5 | 110 | | O2 Sensor Monitor Bank 4 Sensor 4 | 0 | 1.275 | Volts | 0.005 Rich to lean sensor threshold voltage |
| 5 | 201 | | O2 Sensor Monitor Bank 1 Sensor 1 | 0 | 1.275 | Volts | 0.005 Lean to Rich sensor threshold voltage |
| 5 | 202 | | O2 Sensor Monitor Bank 1 Sensor 2 | 0 | 1.275 | Volts | 0.005 Lean to Rich sensor threshold voltage |
| 5 | 203 | | O2 Sensor Monitor Bank 1 Sensor 3 | 0 | 1.275 | Volts | 0.005 Lean to Rich sensor threshold voltage |
| 5 | 204 | | O2 Sensor Monitor Bank 1 Sensor 4 | 0 | 1.275 | Volts | 0.005 Lean to Rich sensor threshold voltage |
| 5 | 205 | | O2 Sensor Monitor Bank 2 Sensor 1 | 0 | 1.275 | Volts | 0.005 Lean to Rich sensor threshold voltage |
| 5 | 206 | | O2 Sensor Monitor Bank 2 Sensor 2 | 0 | 1.275 | Volts | 0.005 Lean to Rich sensor threshold voltage |
| 5 | 207 | | O2 Sensor Monitor Bank 2 Sensor 3 | 0 | 1.275 | Volts | 0.005 Lean to Rich sensor threshold voltage |
| 5 | 208 | | O2 Sensor Monitor Bank 2 Sensor 4 | 0 | 1.275 | Volts | 0.005 Lean to Rich sensor threshold voltage |
| 5 | 209 | | O2 Sensor Monitor Bank 3 Sensor 1 | 0 | 1.275 | Volts | 0.005 Lean to Rich sensor |

| Mode (hex) | PID (hex) | Data bytes returned | Description | Min value | Max value | Units | Formula |
|---|---|---|---|---|---|---|---|
| 5 | 020A | | O2 Sensor Monitor Bank 3 Sensor 2 | 0 | 1.275 | Volts | threshold voltage 0.005 Lean to Rich sensor threshold voltage |
| 5 | 020B | | O2 Sensor Monitor Bank 3 Sensor 3 | 0 | 1.275 | Volts | 0.005 Lean to Rich sensor threshold voltage |
| 5 | 020C | | O2 Sensor Monitor Bank 3 Sensor 4 | 0 | 1.275 | Volts | 0.005 Lean to Rich sensor threshold voltage |
| 5 | 020D | | O2 Sensor Monitor Bank 4 Sensor 1 | 0 | 1.275 | Volts | 0.005 Lean to Rich sensor threshold voltage |
| 5 | 020E | | O2 Sensor Monitor Bank 4 Sensor 2 | 0 | 1.275 | Volts | 0.005 Lean to Rich sensor threshold voltage |
| 5 | 020F | | O2 Sensor Monitor Bank 4 Sensor 3 | 0 | 1.275 | Volts | 0.005 Lean to Rich sensor threshold voltage |
| 5 | 210 | | O2 Sensor Monitor Bank 4 Sensor 4 | 0 | 1.275 | Volts | 0.005 Lean to Rich sensor threshold voltage |
| 9 | 0 | 4 | mode 9 supported PIDs 01 to 20 | | | | Bit encoded |
| 9 | 1 | 1 × 5 | VIN Message Count in command 09 02 | | | | Returns 1 line/packet (49 01 05 00 00 00 00), where 05 means 05 packets will be returned in VIN digits. |
| 9 | 2 | 5 × 5 | Vehicle identification number (VIN) | | Returns the VIN as a multi-frame response using the ISO 15765-2 protocol. | five fames, with the first frame encoding the size and count. | |
| 9 | 4 | varies | calibration ID | | | | Returns multiple lines, ASCII coded |
| 9 | 6 | 4 | calibration | | | | |

In certain embodiments, one or more of the computing devices 610, 630 and 650 analyze the received data from the on-board computing device 660 to, for example, send alerts, determine a driving status or habit of the corresponding driver, prepare reports, and/or control the engine of the vehicle. To illustrate, the computing device 610 forms a transmission for delivery, via the communication fabric 620, to the on-board computing device 660 that includes the standardized Parameter ID (PID) codes requesting the VIN of the corresponding vehicle. The on-board computing device 660 responds by transmitting the VIN back to the computing device 610, which the computing device 610, in turn, stores at the data repository 615, remote to the vehicle. The computing device 610 analyzes the received VIN to determine the make, and/or model, and/or year of model, and/or body style, and/or plant code of the corresponding vehicle.

In certain embodiments, one or more of the computing devices 610, 630, and 650 use the received diagnostic information to determine if the vehicle has been recalled. To illustrate, the computing device 610 compares the make and model of the vehicle determined from the received VIN with data stored in the data repository 615 regarding vehicle recalls to find a match. Alternatively, or in combination, the computing device 610 conducts a search on the Internet to determine up-to-date information about vehicle recalls and compares same with the determined make and model of the vehicle to find a match. If a match is found, the computing device 610 forms a transmission for delivery to the on-board computing device 660 including an alert, such as sending a PID that instructs the on-board computing device 660 to turn on an engine warning light (e.g., malfunction indicator lamp) in the vehicle. Alternatively or in combination, the computing device 610 forms the transmission for delivery to a known delivery address of a driver of the vehicle.

In certain embodiments, one or more of the computing devices 610, 630, and 650 receives and stores in a corresponding data repository an identifier of a driver and/or a delivery address (e.g., a telephone number, an email address, a computer Internet Protocol address, and the like) of a driver associated with the vehicle. To illustrate, the driver accesses a website of the host to create a profile about the driver and a corresponding vehicle. The profile data includes an identifier for the driver (e.g., name, an account number, and the like), the VIN of the vehicle, and a delivery address (e.g., telephone number) of the driver. The profile data, in turn, is stored in the data repository 615 of the computing device 610. Subsequent to receiving the profile data, the computing device 610 queries the on-board computing device 660 of the corresponding vehicle for the VIN. For example, the computing device 610 compares the received VIN with one or more stored VINs in the data repository 615 to find a match. The computing device 610, in turn, determines the associated identifier and/or the delivery address, such as a telephone number, of the driver and sends an SMS or automated voice message to the delivery address of the driver indicating that the vehicle has been recalled. Here, the telephone processes the message and delivers the message to the driver.

In another example, the computing device 610 sends an alert regarding the diagnostic data for delivery to the driver. To illustrate, when the computing device 610 receives data indicating that the fuel level of the vehicle is low the computing device 610 sends a PID to the on-board computing device 660 to toggle the corresponding fuel light of the vehicle on and off. Alternatively or in combination, the computing device 610 send a transmission to the on-board computing device 660 that controls a GPS monitor of the vehicle. The transmission including a instructions to display fuel stations in the vicinity of the vehicle.

In certain embodiments, one or more computing devices 610, 630, and 650 use the received information from the on-board computing device 660 to rate a driving status or determine a driving habit of the driver of the corresponding vehicle. To illustrate, the computing device 610 queries the on-board computing device 660 for data about the vehicle to rate the driver's use of the vehicle, such as by sending the PID requesting one or more of: a fuel system status, calculated engine load value, engine coolant temperature, short and long term fuel trim, fuel pressure, engine RPM, speed of vehicle, throttle position, acceleration peddle position, run time since engine start, distance traveled with malfunction indicator lamp, engine run time, fuel level, fuel type, accelerator pedal position, the like, and a combination thereof. The computing device 610 then compares the values of the received data to one or more predetermined values for acceptable standards for driving and determines a ranking for the status of the driver of the corresponding vehicle. A low status ranking would indicated that the driver is driving below standards and a high status ranking would indicate that the driver is driving above standards. For example, if the received data indicates that the engine of the vehicle is on, the vehicle has been driven for a while with a low amount of fuel, and the throttle position indicates a high acceleration, then the computing device 610 ranks the driving status of the driver as low compared to the predetermined values for acceptable standards.

In certain embodiments, one or more of the computing devices 610, 630, and 650 query the on-board computing device 660 a plurality of times for data about the vehicle and uses the received data to determine a driving habit of the driver. For example the computing device 610 requests, receives and stores diagnostic data from the on-board computing device 660 for each of a plurality of times. The received diagnostic data is then used to determine the driving habit of the driver. To illustrate, if first car rental customer consistently drives a corresponding vehicle over a period of time with above a 20% full tank of premium gasoline, then the first car rental customer is ranked as having a "good" driving habit that is above the predetermined standard of, for example, above 10% full tank. Other means for ranking the driving habit of the driver are also contemplated.

In certain embodiments, the driving status and/or driving habit of the driver is used to determine an offer to be made to the driver. To illustrate, the computing device 610 prepares a report indicating that the first car rental customer has a "good" driving status and/or habit which is then made accessible to a rental car agency. The rental car agency, in turn, determines that the first car rental customer's "good" driving status and/or habit makes the first car rental customer eligible for an offer of 10% off rental car fees. The 10% off offer is then communicated with the first car rental customer, such as by sending a coupon to the delivery address of the first car rental customer stored in one or more of the data repositories 615, 635, and/or 655. Alternatively, or in combination, the rental car agency stores the driving status and/or habit of the first car rental customer at a data repository of its computing device 630 (e.g., data repository 635) and the next time the first car rental customer is at the rental car agency's facility the computing device 630 notifies the rental car counter that the first car rental customer should be made the offer of 10% off her rental car fees due to her "good" driving status and/or habit. Other means for presenting an offer to the driver are also contemplated.

In certain embodiments, the data received from the on-board computing device 660 is used to create and store a driving profile for a driver. The driving profile is then used to subsequently identify the driver. To illustrate, data received from the on-board computing device 660 over time for driver a second car rental customer indicates that she typically drives with premium gasoline in the car with the throttle position constantly toggling between high and low positions. The received data is used to create a profile of the second car rental customer. Later, when the second car rental customer rents a car during a business trip, the computing device 610 receives data from the on-board computing device 660 of the rental car. The received data is compared with one or more profiles stored in the data repository 635 to find a match. When a match is found, the identify of the driver associated with the matched profile is determined and the driver of the rental car is recognized as the second car rental customer, for example.

Figure 7A:
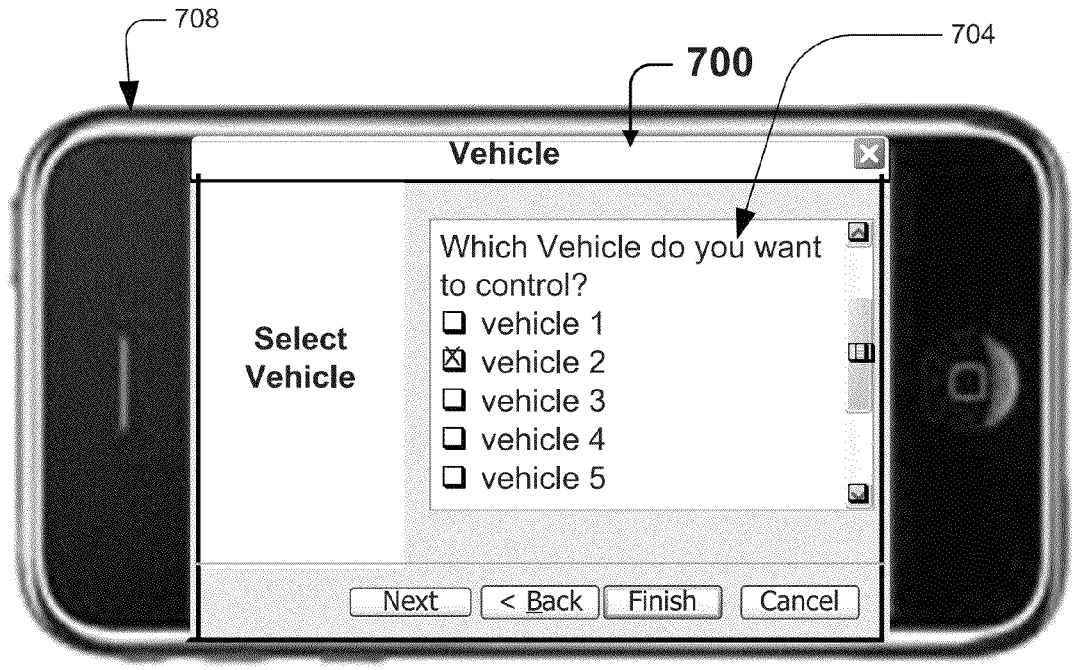
FIGS. 7A and 7B each illustrates an exemplary user interface for a fuel pump controller.
Figure 7B:
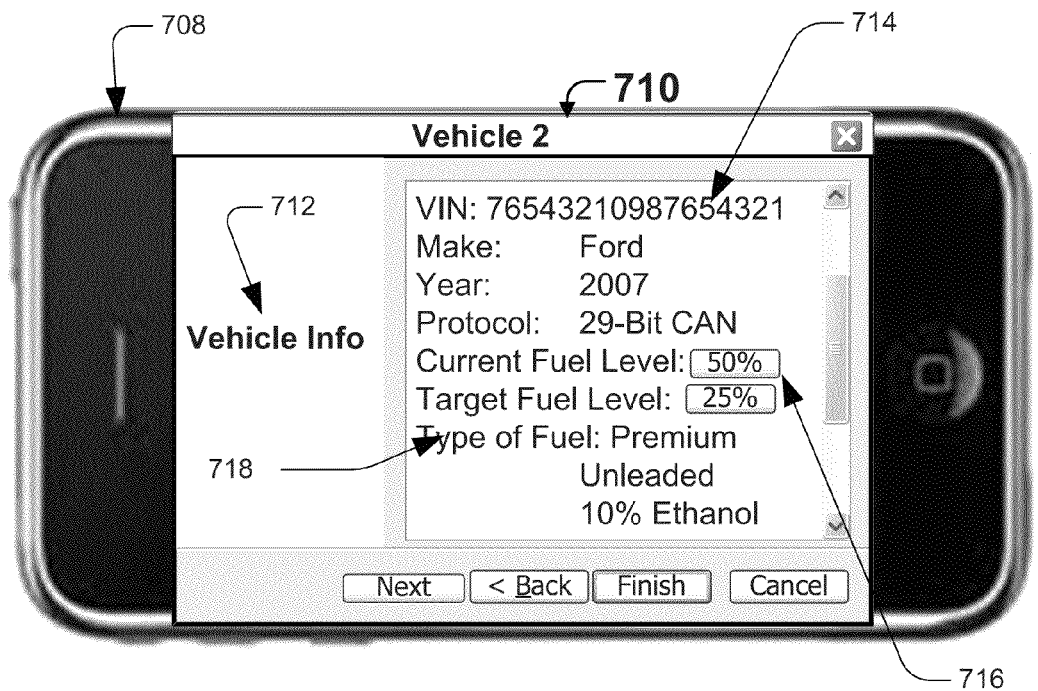

Referring to FIGS. 6, 7A, and 7B, a user interface (UI) 700 for rendition on the external fuel pump controller 122, shown as a smart phone 708, is illustrated. In FIG. 7A, the user of the external fuel pump controller 122 has selected vehicle 2 on the smart phone 708. In FIG. 7B the vehicle information 712 for the selected vehicle 2 is rendered on UI 710. The information 714 includes the VIN, Make, and Year of the vehicle. The UI 710 also includes diagnostic information received from the computing device 660 of vehicle 2: Current Fuel Level 50% (element 716), and the type of fuel in the tank of vehicle 2.

In certain embodiments, the information received from the on-board computing device 660 of the vehicle is used by the external fuel pump controller 122, such as the controller 122 of FIG. 3, to actuate the fuel pump of the combustion engine to recover a predetermined amount of fuel (e.g., predetermined amount of gallons to be recovered or a percentage of the tank to be recovered). In FIG. 7B, the predetermined amount of fuel is denoted by a Target Fuel Level 718 of 25%.

To illustrate, the external fuel pump controller 122 forms a transmission for wireless delivery to the I/O 661 of the on-board computing device 660. The transmission includes a PID requesting information about a percentage of fuel disposed in the tank of the vehicle. The on-board computing device 660, in turn, sends a response signal to the external fuel pump controller 122 indicating that the tank of the vehicle is 50% full. The user of the external fuel pump controller 122 sets the predetermined amount of fuel to be recovered from the tank to be such that the tank of the vehicle remains only 25% full, Target Fuel Level 178 of 25%. Here, the external fuel pump controller 122 uses the information received from the on-board computing device 660 to determine the amount of fuel left in the tank and compares the determined amount to the predetermined amount. If a match is not found, the external fuel pump controller 122 sends a signal to the on-board computing device 660 to continuously operating the fuel pump of a combustion engine. The external fuel pump controller 122 repeatedly communicates with the on-board computing device 660 of the vehicle requesting data about the amount of fuel in the tank until a match is found. When the remaining amount of fuel in the tank matches the predetermined amount (e.g., 25% in this example), the external fuel pump controller 122 sends a signal to the on-board computing device 660 to stop the continuous operation of the fuel pump.

Other examples of Target Fuel Levels 718 include: five percent; ten percent; fifteen percent; twenty percent; twenty five percent; thirty percent; thirty five percent; forty percent; forty five percent; fifty percent; fifty five percent; sixty percent; sixty five percent; seventy percent; seventy five percent; eighty percent; eighty five percent; ninety percent; ninety five percent; and one hundred percent of the fuel in the tank.

Referring back to FIG. 6, in certain embodiments, the information of a plurality of vehicles received from a plurality of controllers that are sent to a plurality of computing devices 630 from different localities is sent to the computing device 610 of a host. For example, the computing devices 650 of each of a plurality of users communicate the information from a plurality of respective vehicle (e.g., actual fuel recovered from each), to the computing device 630, which is operated by the store manager of Company XYZ. The computing devices 650 of a plurality of store managers of a plurality of companies, in turn, communicate the respective received information to the computing device 610, which is operated by a host. Consequently, the computing device 610 of the host receives information from a plurality of computing devices 630 of store managers, each of which receives information from a plurality of user computing devices 650 for a plurality of on-board computing devices 660 of a plurality of vehicles.

Figure 8A:
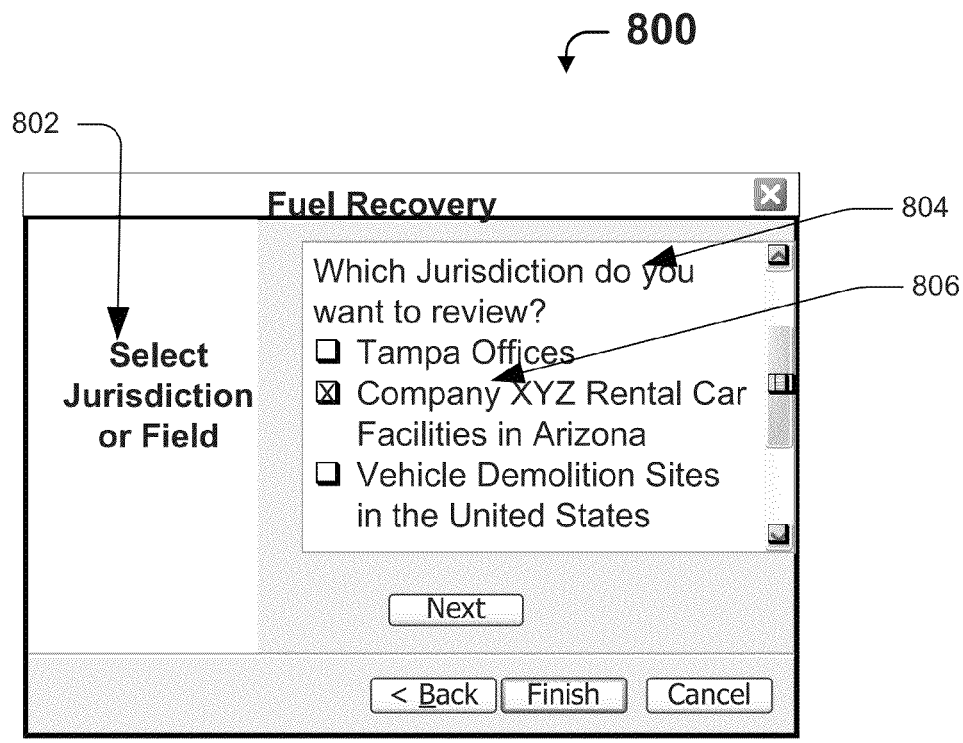
FIGS. 8A and 8B each illustrates an exemplary user interface for a computing device.
Figure 8B:
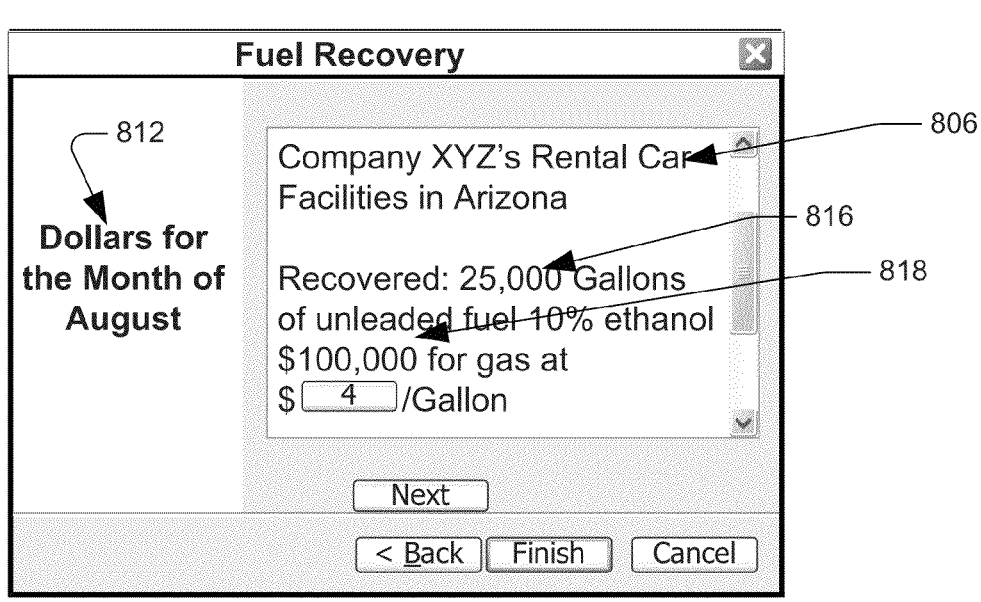

The information received at the computing device 610 of the host can be filtered, mined, analyzed, and reported upon through the execution of the a series of instructions encoded on the computer readable medium 613. Referring to FIGS. 8A and 8B, the processor 612 executes the code 614 to render exemplary UI 800. Here, a host uses UI 800 to select a jurisdiction or field 802 to filter data received within the system 600 of FIG. 6 about fuel recovery. In this illustration, the host has selected 804 to filter the fuel recovery data for Company XYZ's rental car facilities in Arizona 806 for fuel recovery in the month of August. The data shows that a total of 25,000 actual gallons 816 of fuel were recovered from a plurality of vehicles in the month of August. At $4 per gallon, the recovery value in dollars is estimated 818 as $100,000. In certain embodiments, the host uses the computing device 610 to transmit a report re same to the computing device 630 of the participant (e.g., manager of a Company XYZ store in Arizona). In certain embodiments, the processor 632 executes the code 634 to render similar exemplary UI to filter, view, analyze, or mine the information it has access to.

Thus, the foregoing description demonstrates how the principles of the present invention are used for recovering fuel from a system in which fuel is normally pumped to an engine, e.g. in a vehicle fuel system. With the foregoing disclosure in mind, it is believed that various ways of recovering fuel from a fuel delivery system, according to the principles of the present invention, will be apparent to those in the art.

Figure 5:
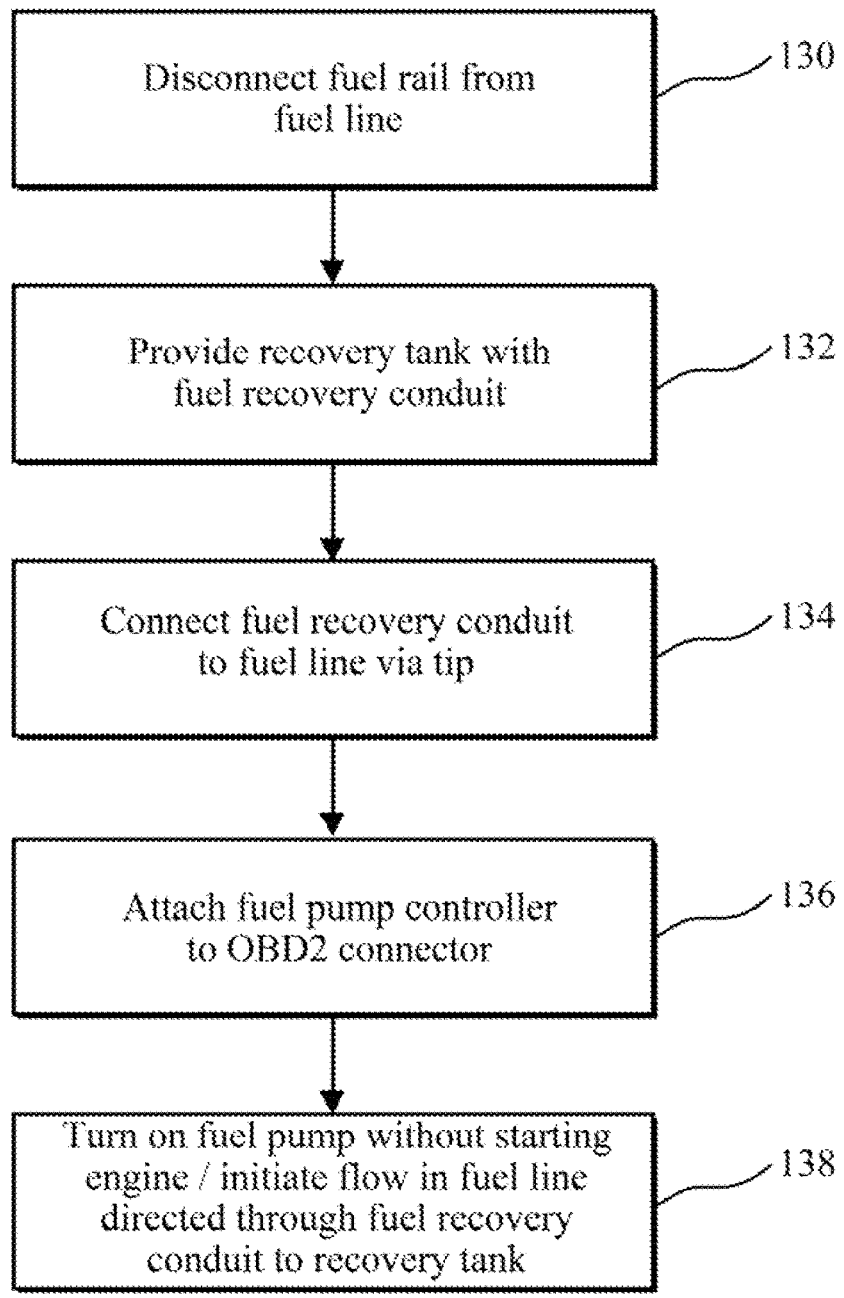
FIG. 5 is a schematic illustration of the method by which fuel is drained from a vehicle, according to the principles of the present invention.

The schematic flow chart diagrams included are generally set forth as a logical flow-chart diagram (e.g., FIG. 5). As such, the depicted order and labeled steps are indicative of one embodiment of the presented method. In certain embodiments, other steps and methods are conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types are employed in the flow-chart diagrams, they are understood not to limit the scope of the corresponding method (e.g., FIG. 5). Indeed, some arrows or other connectors may be used to indicate only the logical flow of the method. For instance, an arrow indicates a waiting or monitoring period of unspecified duration between enumerated steps of the depicted method. Additionally, the order in which a particular method occurs may or may not strictly adhere to the order of the corresponding steps shown.

In certain embodiments, individual steps recited in FIG. 5 are combined, eliminated, or reordered. In certain embodiments, the computer readable program code described reside in any other computer program product, where that computer readable program code is executed by a computer external to, or internal to, systems 100 or 600 (FIGS. 1 and 6, respectively), to perform one or more of steps recited in FIG. 5. In either case, in certain embodiments, the computer readable program code is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, and the like.

Examples of computer readable program code include, but are not limited to, micro-code or micro-instructions, machine instructions, such as produced by a compiler, code used to produce a web service, and files containing higher-level instructions that are executed by a computer using an interpreter. For example, embodiments are be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods, for example, described herein may be combined in any combination, except mutually exclusive combinations. The embodiments described herein can include various combinations and/or sub-combinations of the functions, components and/or features of the different embodiments described. For example, multiple, distributed qualification processing systems can be configured to operate in parallel.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

I claim:

1. A remote computing device comprising a processor and a non-transitory computer readable medium having computer readable program code disposed therein for bidirectional communication with an engine control unit disposed in a combustion engine vehicle, the computer readable program code comprising a series of computer readable program steps to effect:
    establishing communication between said processor and the engine control unit disposed in the vehicle, wherein the engine control unit controls a fuel pump disposed in said vehicle; and
    causing the fuel pump to continuously pump fuel from a fuel tank disposed in said vehicle.

2. The remote computing device of claim 1, wherein causing the fuel pump to continuously pump fuel occurs without starting the combustion engine.

3. The remote computing device of claim 1, wherein the establishing communication includes receiving information from the engine control unit that is sufficient to determine an amount of fuel disposed in the fuel tank.

4. The remote computing device of claim 1, wherein the computer readable program code comprises a further series of computer readable program steps to effect causing the fuel pump to stop pumping when a predefined amount of fuel is recovered from the fuel tank.

5. The remote computing device of claim 1, wherein the computer readable program code comprises a further series of computer readable program steps to effect:
    prior to said causing the fuel pump to continuously pump fuel, sending a first inquiry to the engine control unit requesting data about a first amount of fuel in the fuel tank;
    receiving from the engine control unit data about the first amount;
    sending a subsequent, second inquiry to the engine control unit requesting data about a second amount of fuel in the fuel tank;
    receiving from the engine control unit data about the second amount;
    using the received said first amount and second amount to determine an actual amount of fuel pumped from the fuel tank; and
    reporting at least one of:
        the actual amount of said fuel recovered from the fuel tank; and
        a monetary value of the actual amount of said fuel.

6. The remote computing device of claim 1, wherein the computer readable program code comprises a further series of computer readable program steps to effect:
    establishing communication between said processor and a plurality of said engine control units each disposed in a corresponding said vehicle;
    receiving a selection of at least one said vehicle from which to recover the fuel disposed in the corresponding said fuel tank; and
    for each said selected said vehicle, causing the fuel pump to continuously pump fuel from the fuel tank disposed in the selected said vehicle.

* * * * *